United States Patent Office 3,621,535
Patented Nov. 23, 1971

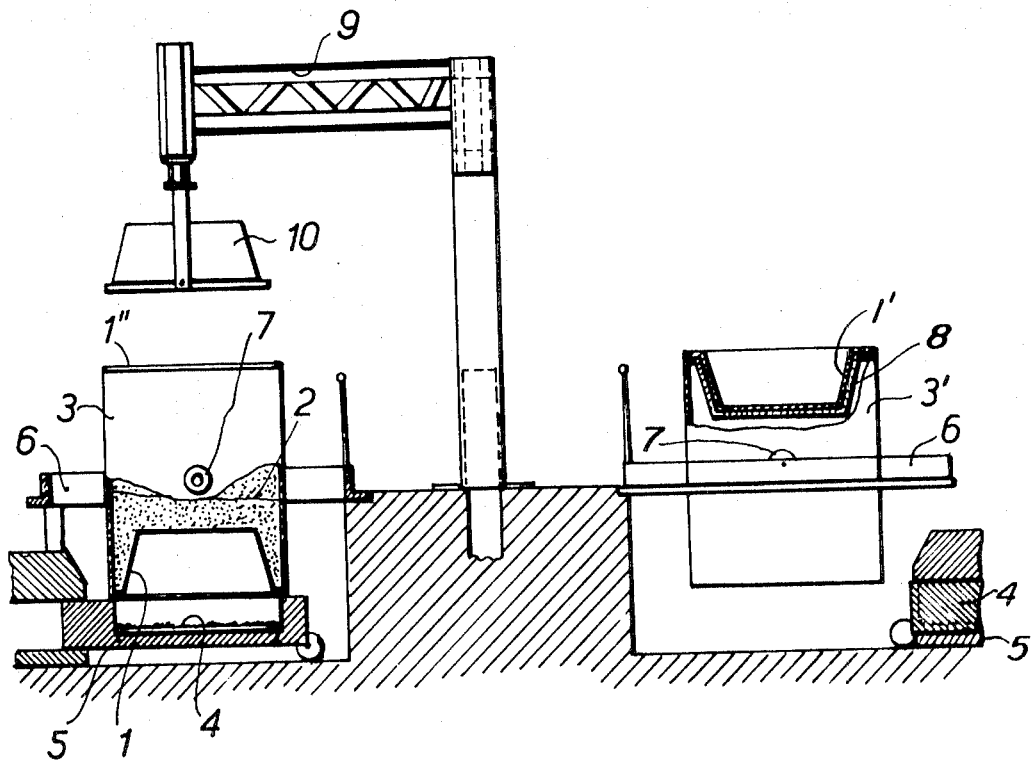

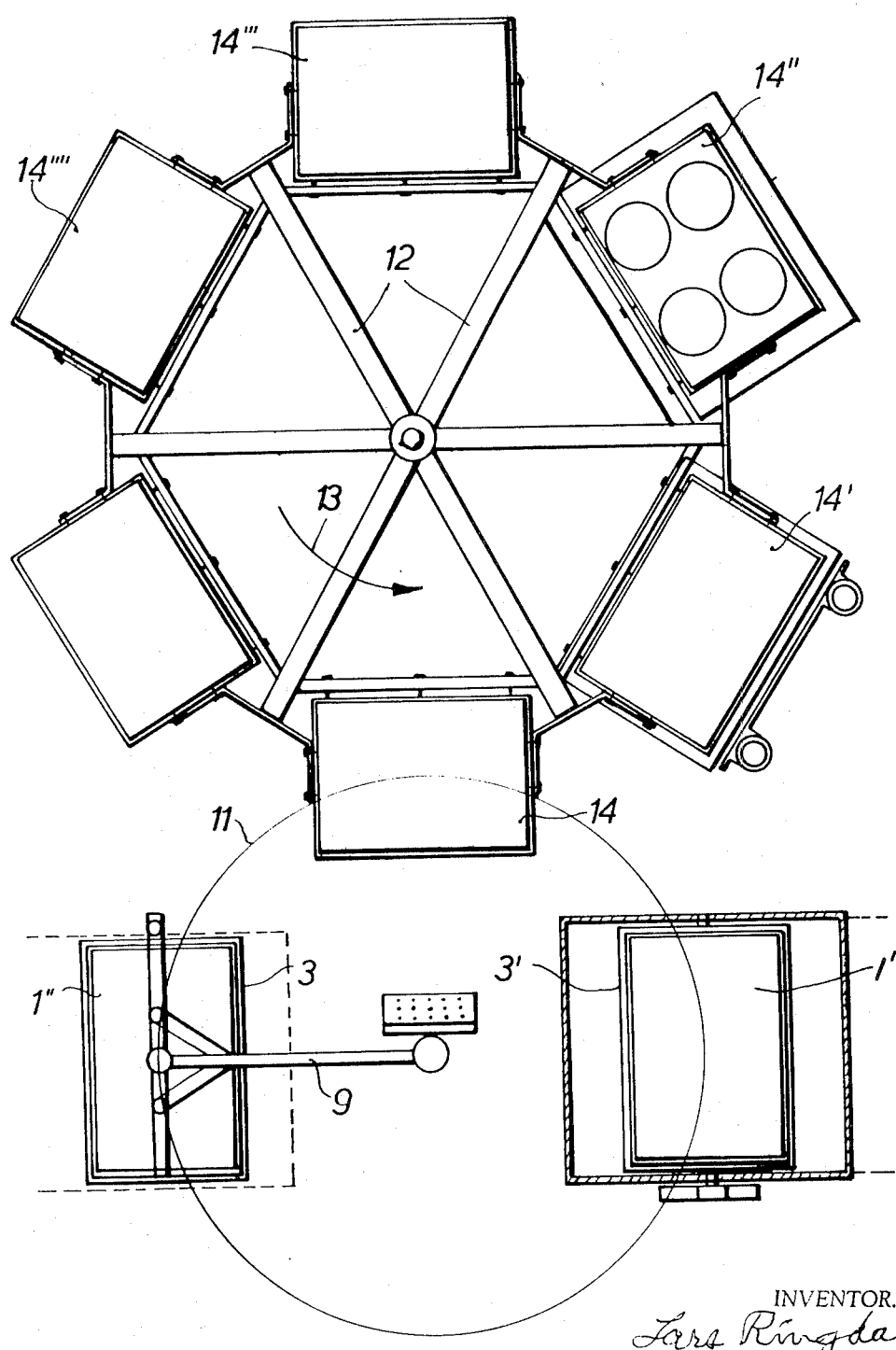

3,621,535
APPARATUS FOR PRODUCING ARTICLES FROM PLASTIC MATERIAL
Lars Ringdal, Montebelloveien 15, Oslo 3, Norway
Filed Oct. 8, 1969, Ser. No. 864,636
Claims priority, application Norway, Nov. 4, 1968, 4,365/68
Int. Cl. B29c 5/00, 5/04
U.S. Cl. 18—26 R    9 Claims

ABSTRACT OF THE DISCLOSURE

Apparatus for moulding articles from plastic materials comprising a container holding a body of plastic material and having a plurality of openings for receiving moulds on which the articles are to be formed, said container being rotatable to move one of the moulds so that it is at the bottom of the container with its mould surface facing into the container and covered with the plastic material, and means for heating said one mould to form a plastic article thereon.

---

The present invention relates to an improvement in an apparatus for the production of articles of plastic materials, comprising a mould upon which the plastic material is to be deposited by means of sintering when heat is applied to the mould. The production of plastic articles in this manner, by sintering of the particulate plastic material, has been previously used in various ways. Hollow bodies have, for instance, been produced in closed moulds into which predetermined quantities of plastic material are determined, the moulds being then rotated about two axes during heating. A hollow body is thereby produced as the plastic material is distributed upon the interior of the rotating mould, and the exterior of the hollow body is formed by the walls of the mould, the desired external appearance being imparted to the body. The interior of the body is irregular, however, and formed by the sintered plastic particulate with no distinct pattern. By means of rotary casting, therefore, the external appearance of the article corresponds to the mould, while the concave interior is irregular. If it is necessary to give further treatment to the irregular side, the time and work involved will by reason of the difficulties of operating on the inside of a cavity, far exceed that necessary if it had been possible to undertake the further treatment of the article on its convex side.

The actual construction of the prior moulds, and the members supporting them so that they may rotate about two axes, are, moreover, relatively complex and expensive and the main object of the present invention is thus to provide an improvement in an apparatus for producing articles of plastic material where, without rotation of the mould during sintering and without the supply of new plastic material for each article, it is possible to produce, for example, vessel-shaped articles having one open side where the article is formed by the deposition of plastic material upon the convex or exterior side or sides of a mould, the concave interior of the article thus receiving a surface imparted by the mould during casting, while the irregular surface of sintered plastic material faces outwardly on the article and is therefore more readily and rapidly treated, if such further treatment is necessary.

In accordance with the invention, this is achieved by employing a container having mould-receiving openings, for example at each end, and disposing a mould, which is pressed from sheet metal, for example, as the bottom in a downwardly open end of the container. The container is filled with plastic material which is capable of sintering upon the application of heat, and the heat is applied to the mould from beneath by a suitable means. After a determined period of heating, the desired amount of plastic material will have deposited on the mould, that is to say that the article has the desired thickness.

A further mould is inserted at the upper, open end of the container, and on rotation of the container so that the lower mould with the finished article is turned upwardly, unused plastic material in the container will fall over the new mould which now forms the bottom in the container and the upper mould is removed, the plastic material being deposited by application of heat on the new mould which now forms the bottom of the container. The formed plastic article is taken from the removed mould which is then returned to position for deposition of a new plastic article when the container with the last said mould is again rotated so that said mould becomes the bottom in the container.

The invention is thus primarily characterized in that the mould forms the bottom of a container for the plastic material, and that a source of heat is located beneath the mould for heating of said mould.

A further feature of the invention is that the container is rotatably mounted and is provided with a plurality of openings wherein moulds may be inserted and brought to the source of heat on rotation of the container.

Furthermore, in the preferred embodiment, the container may be in the form of a box which is open at opposing ends, the openings being closed by the moulds which successively form the bottom of the container and face the source of heat, as the container is rotated.

It is to advantage that the heat source is movable and adapted to be moved away from the region of the bottom of the container after a certain period of time for heating the mould.

Other features and details of the present invention will be apparent from the following description of the embodiment example, with reference to the drawings where:

FIG. 1, which is an elevational view in partial section, shows an apparatus for the production of plastic articles effected in accordance with the invention, and FIG. 2 shows the apparatus in further detail, viewed from above and in partial section.

A mould 1, upon which the plastic material 2 is to be deposited is, as shown in FIG. 1, disposed as bottom in a container 3. It is to adavntage that the container 3 is of a cross sectional configuration corresponding substantially to the dimensions of one or more of the articles to be produced. Since the mould 1 forms the bottom of the container 3, the plastic material 2 will fall by force of gravity upon the mould 1. When heat is thereafter applied to the mould 1, from a heat source 4 in a transportable carriage 5, the mould will rapidly become so hot that the plastic material is sintered on the side or sides of the mould facing inwardly of the container 3. After a determined period of time, sufficient heat will have been applied to sinter the plastic material on the mould to the desired thickness. In the embodiment illustrated the heat source 4, 5 is then withdrawn as illustrated on the right-hand half portion of FIG. 1, and as the container 3 is rotatably mounted in a frame 6, it may be rotated about an axis 7.

A container 3' shown at the right in FIG. 1 is illustrated as having been rotated after an article had been deposited on a mould 1', in the manner described above in connection with the container 3 and the mould 1. The trough-like plastic article, shown in section at the right in FIG. 1, is here designated by the numeral 8, and after removal of the mould 1' and the plastic article from the opening in the container 3' a new mould is inserted in the opening to later become the bottom in the container 3'. When the container 3' is rotated so that the new mould is at the bottom, the heating means 4, 5 is returned to a position with respect to the container 3' corresponding to that shown in the left-hand half portion of FIG. 1 for new deposition of plastic material.

The mould 1'', which faces upwardly at the left in FIG. 1, carrying a plastic article is conveyed to a conveyor 12, further described with reference to FIG. 2, by means of an arm 9 having a suitable means 10 for lifting and further transport of the mould 1''. A new mould is taken from the said conveyor and returned to position on the top of the container 3, whereafter the arm 9 is turned around and the mould 1' on the right-hand side of FIG. 1 is also removed and transferred to the conveyor, and is thereafter replaced by a new mould which is taken from the same conveyor.

On FIG. 2, the arm 9 and the containers 3 and 3' are viewed from above, and the arm 9 is turned through an arc indicated by 11. The conveyor 12 rotates in the direction indicated by the arrow 13, and the arm 9 transfers the mould 1'' to a first frame at position 14 on the conveyor 12. The conveyor then rotates and the hot mould 1', with the sintered article 8 in place, is transferred to the frame now at position 14, and mould 1'' arrives at position 14' where cold air is blown onto the article from the cooler blower for cooling of the mould and the plastic article, and further cooling takes place at 14'' and 14'''. At 14', 14'' and 14''' surface treatment may be given to the side or sides of the finished plastic article facing away from the mould, if such is desirable, inasmuch as the surface treatment of the exterior of an article may be rapidly and inexpensively carried out.

At 14'''' the plastic article and the mould may be separated, and the article removed so that the empty mould arrives at position 14 and is transferred by the arm 9 to one of the containers 3 or 3' which is open at the top. By correctly adjusting the rate of operation of the two containers 3, 3' and synchronizing this rate to the conveyor 12, it is possible to achieve a substantially continuous production of, for example, vessel shaped plastic articles which are produced by the inexpensive sintering method and which may readily be given further treatment on the exterior thereof at no great expense. The production lay-out is also inexpensive to construct and simple to operate.

The example shown serves merely to illustrate the invention and forms no restriction to the protection afforded by this patent.

Having described my invention, I claim:

1. Improvement in an apparatus for the moulding of articles of plastic materials, including a mould upon which sintered shaped articles are to be formed by said materials deposited thereon, said materials being sintered when heat is applied to the mould, characterized in that the apparatus comprises a container for the plastic material, said mould forming the bottom of the container and having a generally convex surface facing inwardly of the container, on which the plastic article is formed, and a heat source located beneath the mould for effecting its heating to form the plastic article on the mould surface.

2. Improvement according to claim 1, characterized in that the container is rotatably mounted and is provided with a plurality of openings wherein moulds may be inserted and brought to a location above the source of heat on rotation of the container.

3. Improvement according to claim 2, characterized in that the container is in the form of a box and is open at opposing ends, the said openings being adapted to be closed by moulds which successively form the bottom of the container and face the source of heat when the container is rotated.

4. Improvement according to claim 1, characterized in that the source of heat is movable and adapted to be moved from the region of the bottom of the container after a certain period of time for heating the mould.

5. Improvement according to claim 1, characterized in that the container is provided with an opening in which the mould is inserted and that the source of heat is located adjacent the mould opening in the container and the mould therein when they face downwardly.

6. Improvement according to claim 1, characterized in that the apparatus includes a conveyor and a movable arm the latter of which may be pivoted inwardly above the upper portion of the container and is adapted to remove therefrom a mould upon which a plastic article has been formed and transfer it to said conveyor, and said arm also being adapted to replace the removed mould in the container with an empty mould.

7. Improvement in apparatus of the type employed for moulding articles of pastic materials including a mould upon which sintered shaped articles are to be formed by said materials deposited thereon, said materials being sintered when heat is applied to the mould, characterized in that the apparatus comprises a container for plastic material to be used in the moulding of a plurality of plastic articles, said mould forming the bottom of the container and having a mould surface facing into the container and covered by the plastic material in the container during a moulding operation, and a heating means located beneath the mould for effecting the deposition of plastic material on the mould surface in the container to form a plastic article thereon.

8. Improvement in apparatus as claimed in claim 7, characterized in that the mould has a mould surface projecting into the container and shaped to produce a vessel-shaped article.

9. Improvement in apparatus according to claim 7, characterized in that the container is provided with an opening into which the mould is inserted, and that said container is movable to bring the opening and the mould to a position in which they are at the top of the container.

References Cited

UNITED STATES PATENTS

| 2,026,624 | 1/1936 | Flower | 25—29 X |
| 3,039,146 | 6/1962 | Engel | 18—6 R X |
| 3,315,016 | 4/1967 | Wersosky et al. | 264—302 X |

ROBERT L. SPICER, JR., Primary Examiner

U.S. Cl. X.R.

18—26 RR; 264—302, 310